(12) United States Patent
Yuan

(10) Patent No.: US 12,528,532 B2
(45) Date of Patent: *Jan. 20, 2026

(54) SYNCHRONOUS FOLDING MECHANISM AND STROLLER HAVING THE SAME

(71) Applicant: Wonderland Switzerland AG, Steinhausen (CH)

(72) Inventor: Jialiang Yuan, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 130 days.

This patent is subject to a terminal disclaimer.

(21) Appl. No.: 17/971,641

(22) Filed: Oct. 23, 2022

(65) Prior Publication Data

US 2023/0038830 A1 Feb. 9, 2023

Related U.S. Application Data

(63) Continuation of application No. 17/072,247, filed on Oct. 16, 2020, now Pat. No. 11,613,291.

(30) Foreign Application Priority Data

Oct. 17, 2019 (CN) .......................... 201910990912.0

(51) Int. Cl.
*B62B 7/10* (2006.01)
*B62B 7/06* (2006.01)
(Continued)

(52) U.S. Cl.
CPC ................ *B62B 7/10* (2013.01); *B62B 7/062* (2013.01); *B62B 9/12* (2013.01); *B62B 9/26* (2013.01)

(58) Field of Classification Search
CPC ........... B62B 7/062; B62B 7/08; B62B 7/064; B62B 2205/20; B62B 2205/003
See application file for complete search history.

(56) References Cited

U.S. PATENT DOCUMENTS 8,991,854 B2 3/2015 Greger
9,193,373 B2 11/2015 Fjelland
(Continued)

FOREIGN PATENT DOCUMENTS

CN 101844574 A 9/2010
CN 104527758 A 4/2015
(Continued)

OTHER PUBLICATIONS

Examination Report in Corresponding Australian Application No. 2023255007, dated Nov. 14, 2024; 4 pgs.
(Continued)

*Primary Examiner* — Emma K Frick
(74) *Attorney, Agent, or Firm* — HAUPTMAN HAM, LLP

(57) ABSTRACT

A synchronous folding mechanism is adapted to be mounted to a stroller, and includes a rear joint, a handlebar joint, a front joint, a swing member and a first link member. The handlebar joint and the front joint are rotatably connected to the rear joint. The swing member has opposite end portions, one of which is rotatably connected to the rear joint. The first link member is rotatably connected to the other one of the end portions of the swing member, and is rotatably connected to one of the handlebar joint and the front joint. Rotation of the one of the handlebar joint and the front joint drives a swinging movement of the swing member relative to the rear joint and a movement of the first link member relative to the rear joint.

20 Claims, 11 Drawing Sheets

(51) Int. Cl.
*B62B 9/12* (2006.01)
*B62B 9/26* (2006.01)

(56) References Cited

U.S. PATENT DOCUMENTS

| | | | |
|---|---|---|---|
| 9,199,658 | B2 | 12/2015 | Chuah |
| 9,475,516 | B1 | 10/2016 | Wang |
| 9,637,154 | B2 | 5/2017 | Liu |
| 9,701,333 | B2 * | 7/2017 | Liu .................. B62B 9/00 |
| 10,106,185 | B2 | 10/2018 | Plested |
| 10,137,922 | B2 | 11/2018 | Yuan |
| 10,155,528 | B2 | 12/2018 | Zhong |
| 11,091,185 | B2 * | 8/2021 | Williams ............... B62B 7/062 |
| 11,325,632 | B2 | 5/2022 | Zhu |
| 11,390,311 | B2 * | 7/2022 | Horst .................. B62B 7/064 |
| 11,685,418 | B2 * | 6/2023 | Zhang ................. B62B 7/083 |
| | | | 280/642 |
| 11,807,289 | B2 * | 11/2023 | Zhong ................. B62B 7/062 |
| 2007/0085302 | A1 | 4/2007 | You |
| 2007/0096434 | A1 | 5/2007 | Haeggberg |
| 2007/0164538 | A1 * | 7/2007 | Yeh .................... B62B 7/08 |
| | | | 280/642 |
| 2013/0140797 | A1 | 6/2013 | Fritz |
| 2013/0340205 | A1 | 12/2013 | Chuah |
| 2014/0167393 | A1 | 6/2014 | Tsai |
| 2014/0327233 | A1 | 11/2014 | Greger |
| 2015/0344058 | A1 | 12/2015 | Liu |
| 2017/0297600 | A1 | 10/2017 | Zhong et al. |
| 2017/0313337 | A1 | 11/2017 | Horst |
| 2018/0194385 | A1 | 7/2018 | Yuan |
| 2018/0327015 | A1 | 11/2018 | Yuan |
| 2019/0322304 | A1 | 10/2019 | Zhong |
| 2020/0353967 | A1 | 11/2020 | Horst |
| 2023/0001977 | A1 * | 1/2023 | Horst .................. B62B 7/064 |
| 2023/0159079 | A1 * | 5/2023 | Lawrence ............ B60N 2/2812 |
| | | | 280/642 |

FOREIGN PATENT DOCUMENTS

| | | | |
|---|---|---|---|
| CN | 204623531 U | 9/2015 | |
| CN | 103523068 B | 4/2016 | |
| CN | 108275194 A | 7/2018 | |
| CN | 110325427 A | 10/2019 | |
| DE | 102015112332 A1 | 2/2017 | |
| DE | 112021003064 T5 * | 3/2023 | ............. B62B 7/147 |
| EP | 2799308 A2 | 11/2014 | |
| GB | 2560075 A | 8/2018 | |
| GB | 2564233 A | 1/2019 | |
| NL | 2029222 B1 | 3/2023 | |
| WO | 2012027795 A1 | 3/2012 | |
| WO | 2016/012850 A1 | 1/2016 | |
| WO | 2020/232652 A1 | 11/2020 | |

OTHER PUBLICATIONS

First Office Action in Corresponding Chinese Application No. 201910990912.0, dated Jun. 28, 2022; 12 pgs.

Search Report in Corresponding UK Application No. GB2016394. 5, dated Apr. 21, 2021; 4 pgs.

* cited by examiner

SYNCHRONOUS FOLDING MECHANISM AND STROLLER HAVING THE SAME

CROSS REFERENCE TO RELATED APPLICATIONS

This application is a continuation application of U.S. application Ser. No. 17/072,247, filed on Oct. 16, 2020. The content of the application is incorporated herein by reference.

BACKGROUND OF THE INVENTION

1. Field of the Invention

The disclosure relates to a stroller, and more particularly to a synchronous folding mechanism and a stroller having the same.

2. Description of the Prior Art

A conventional stroller includes a main frame that is foldable and a snack tray that is detachably connected to the main frame. To put the stroller away to save space, a user may detach the snack tray from the main frame and fold the main frame into a compact size.

However, the snack tray of such conventional stroller is often connected to the main frame by screws or other types of fasteners, which means a dismantling process of the snack tray requires tools and can be quite a hassle. Conversely, if the snack tray remains attached to the main frame, the stroller will occupy too much space which negates the benefit of having the foldable main frame.

SUMMARY OF THE INVENTION

Therefore, the object of the disclosure is to provide a synchronous folding mechanism and a stroller having the same that can alleviate the drawback of the prior art.

According to an aspect of the disclosure, a synchronous folding mechanism is adapted to be mounted to a stroller. The synchronous folding mechanism includes a rear joint, a front joint, a handlebar joint and a swing member.

The rear joint is adapted to be connected to a rear leg of the stroller. The front joint is adapted to be connected to a front leg of the stroller, and is rotatably connected to the rear joint at a first axis that extends a left-right direction with respect to the stroller. The handlebar joint is adapted to be connected to a handlebar support of the stroller, and is rotatably connected to the rear joint at a second axis that extends in the left-right direction.

The swing member has opposite end portions, one of which is rotatably connected to the rear joint at a third axis that extends in the left-right direction.

The synchronous folding mechanism further includes a first link member which is rotatably connected to the other one of the end portions of the swing member at a fourth axis that extends in the left-right direction, and is rotatably connected to one of the handlebar joint and the front joint at a fifth axis that extends in the left-right direction and that is spaced apart from the fourth axis. Rotation of the one of the handlebar joint and the front joint drives a swinging movement of the swing member relative to the rear joint and a movement of the first link member relative to the rear joint.

According to another aspect of the disclosure, a stroller includes an accessory, a main frame and the abovementioned synchronous folding mechanism. The main frame includes a front leg, a rear leg and a handlebar support.

The accessory is connected to the first link member of the synchronous folding mechanism. Movement of one of the handlebar support and the front leg that is connected to the one of the handlebar joint and the front joint relative to the rear leg drives movement of the accessory relative to the rear leg.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Referring to FIGS. 1 to 4, an embodiment of a stroller 200 according to the disclosure includes an accessory which can be a snack tray 204, a main frame 200a and two synchronous folding mechanisms 100 that are spaced apart in a left-right direction (X) with respect to the stroller 200. The accessory also can be an armrest.

Figure 1:
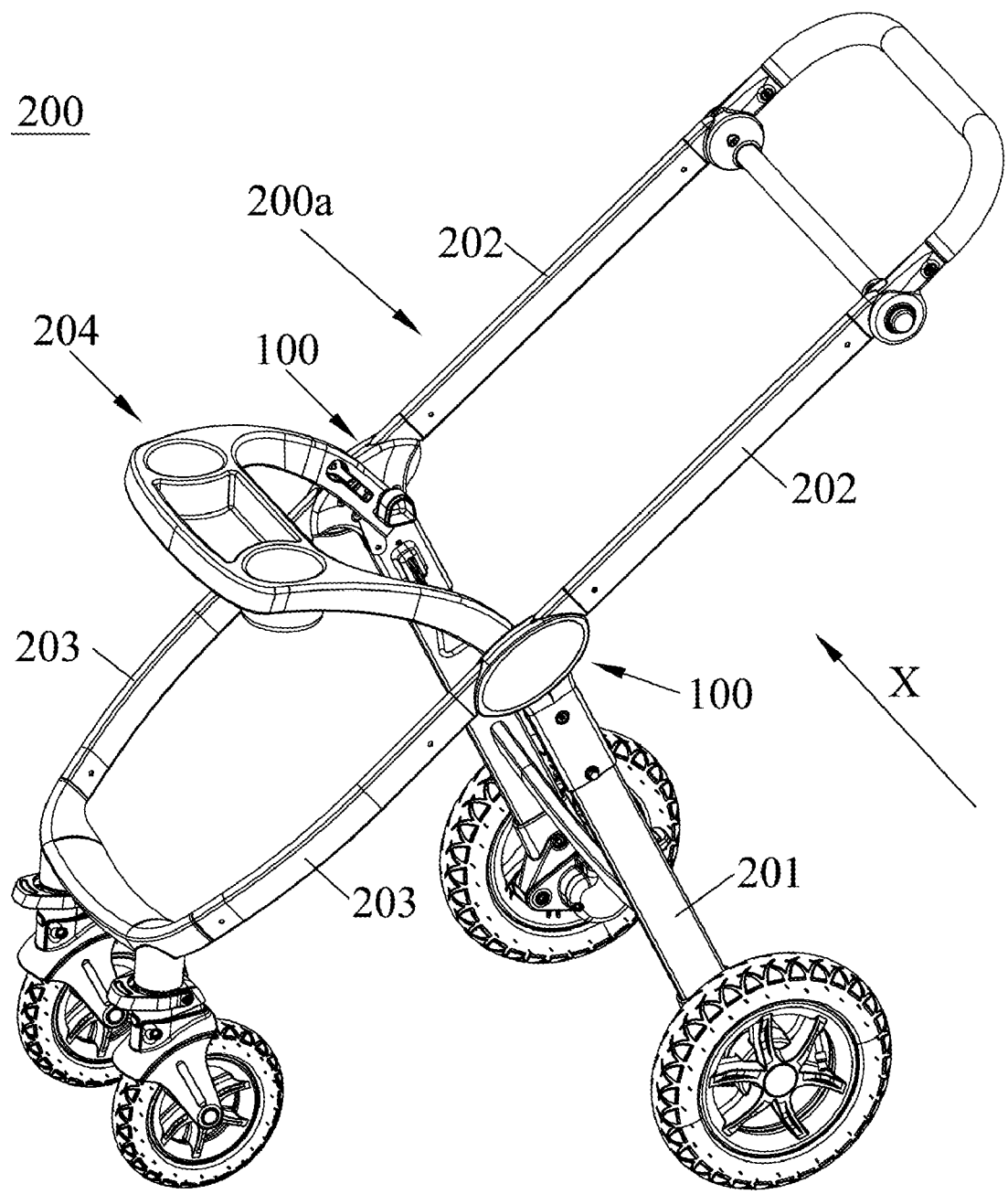
FIG. 1 is a perspective view of an embodiment of a stroller according to the disclosure at an unfolded position.
Figure 2:
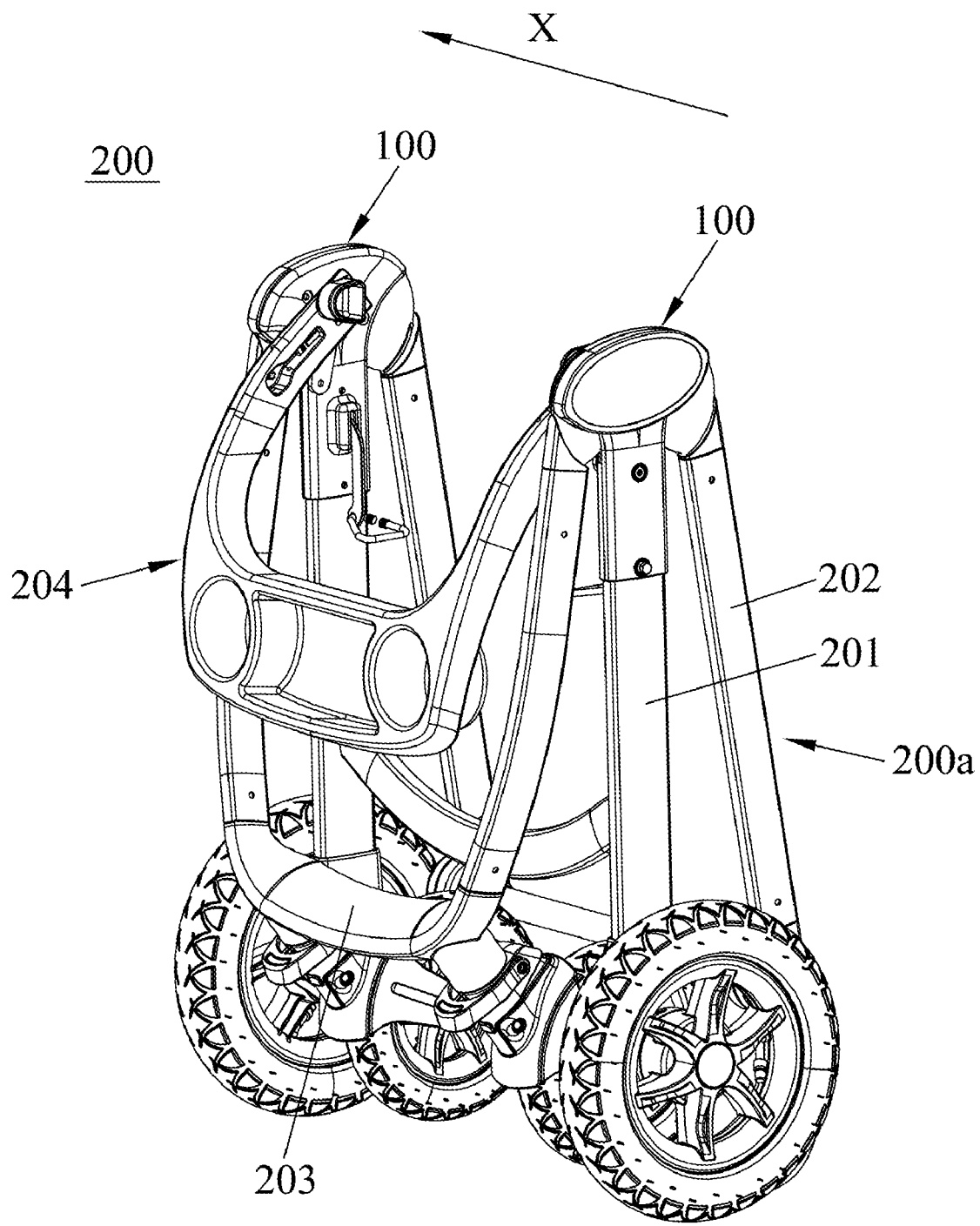
FIG. 2 is a perspective view of the embodiment at a folded position.
Figure 3:
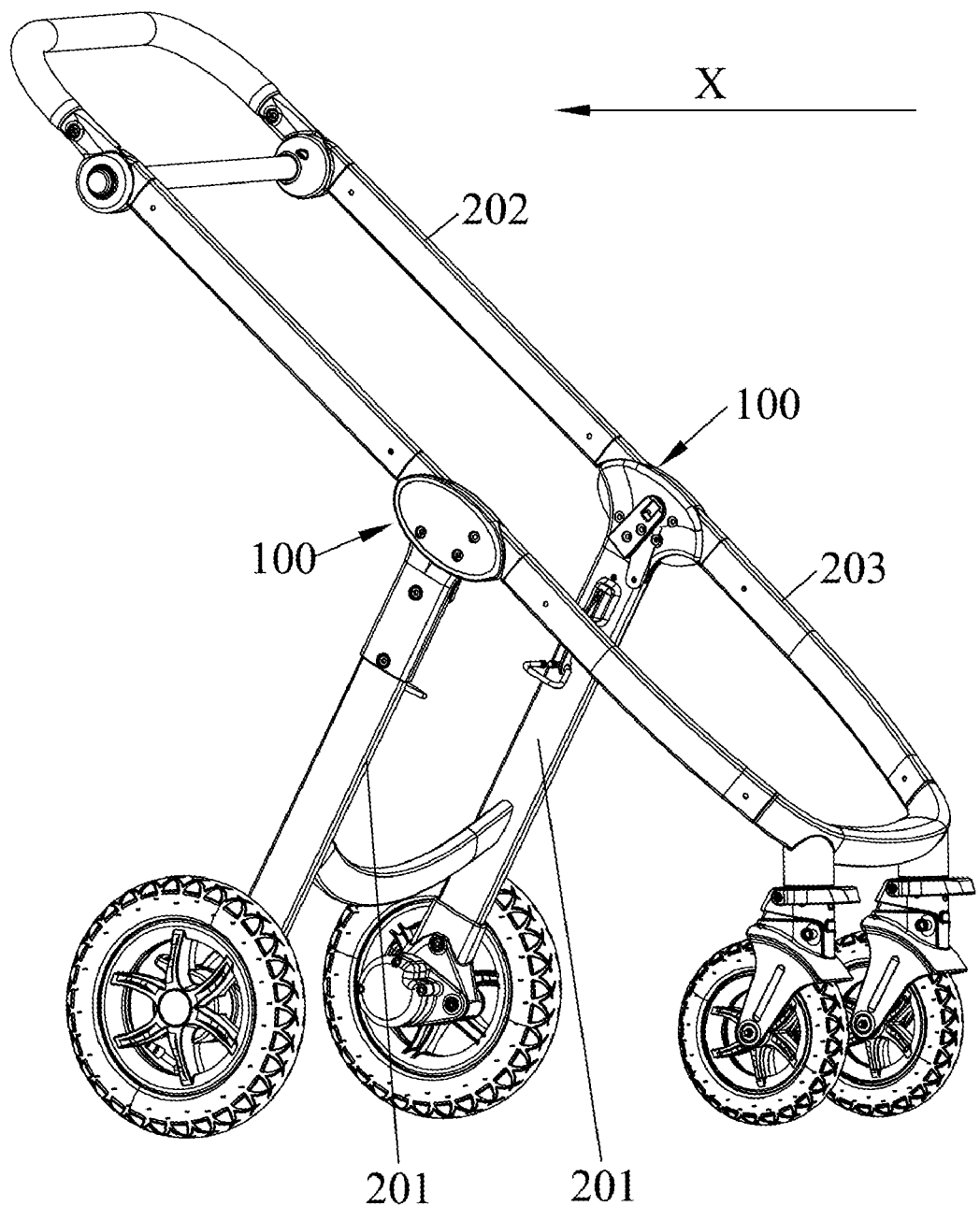
FIG. 3 is a perspective view illustrating the embodiment without a snack tray and at the unfolded position.
Figure 4:
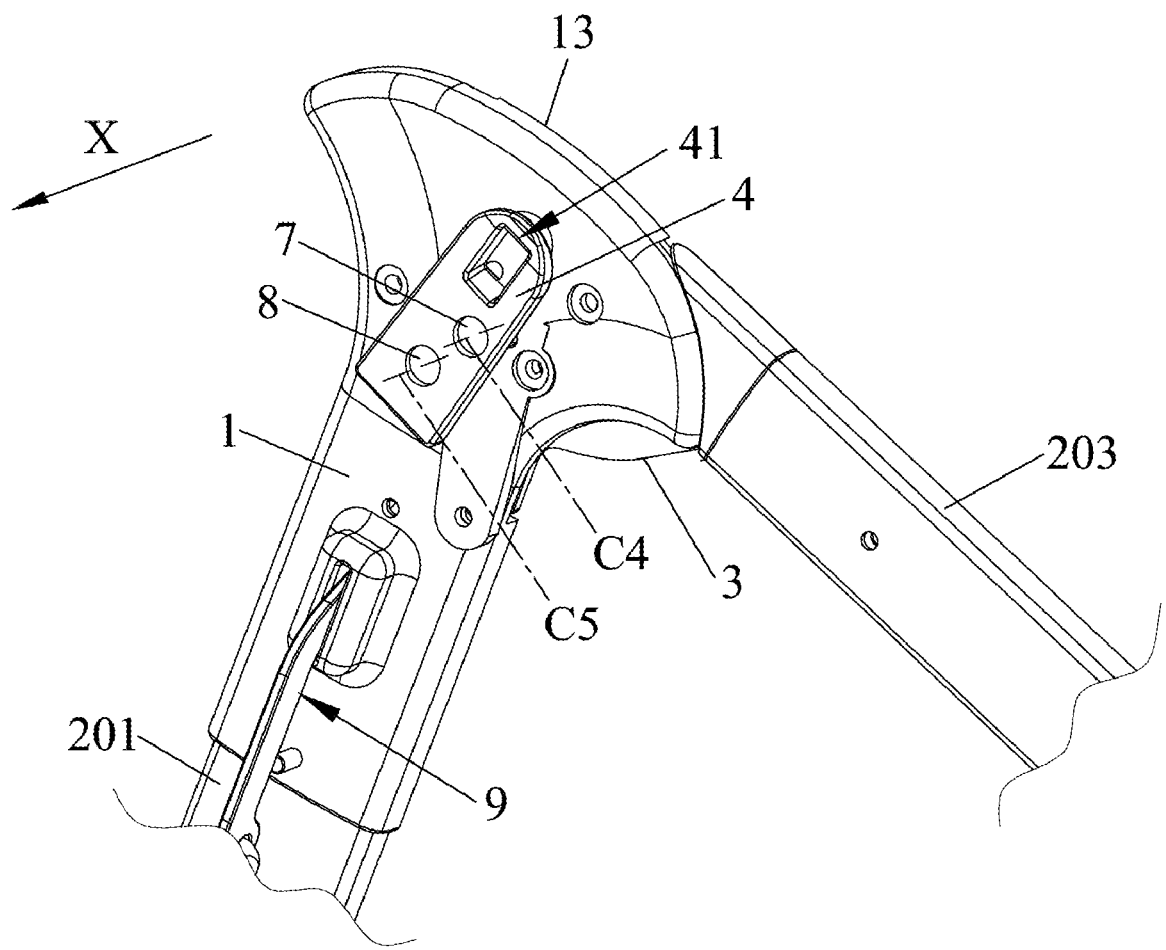
FIG. 4 is a fragmentary perspective view of the embodiment, illustrating a main frame and a synchronous folding mechanism.
Figure 5:
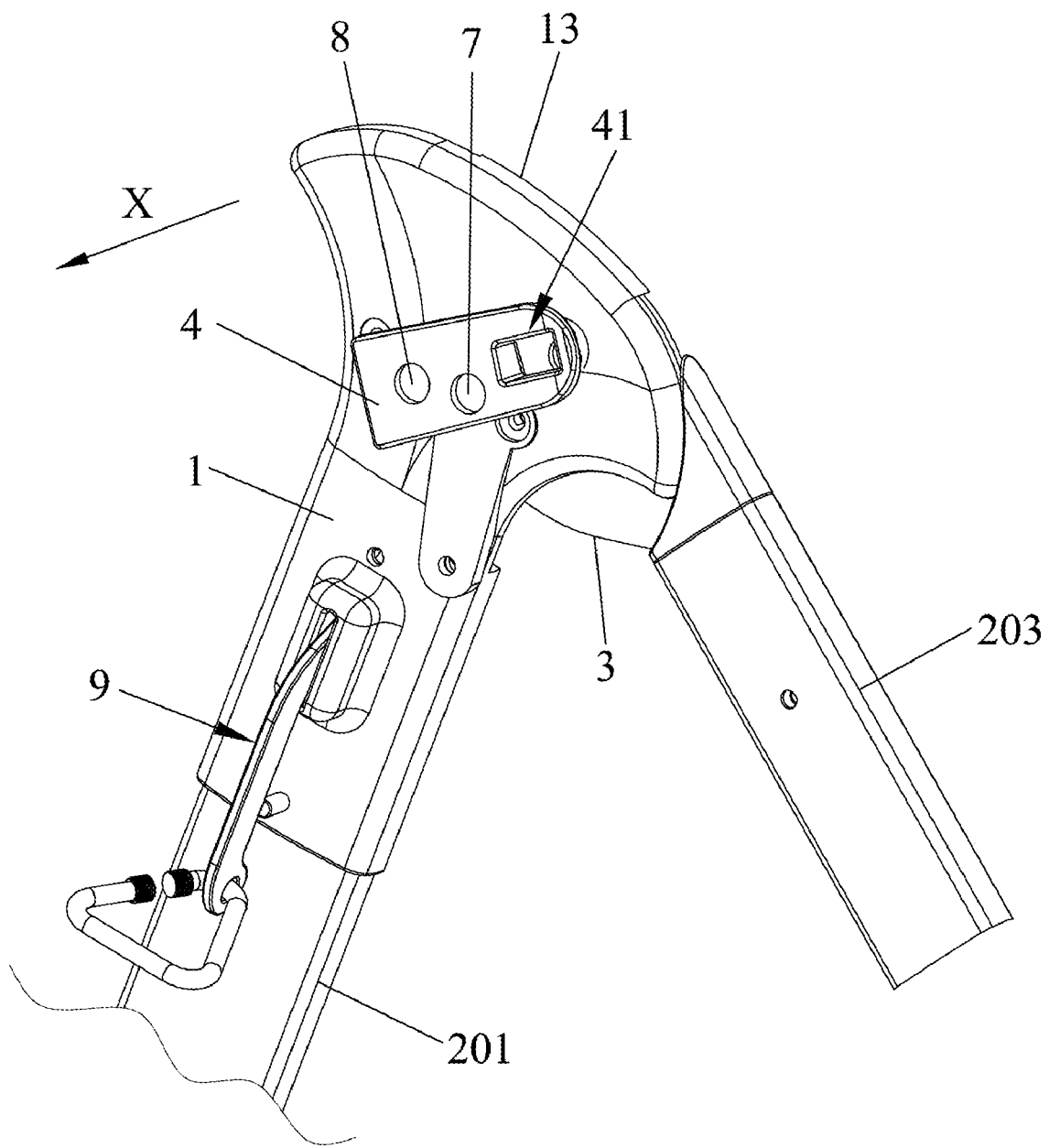
FIG. 5 is a view similar to FIG. 4, illustrating the main frame and the synchronous folding mechanism during a folding process of the embodiment.
Figure 6:
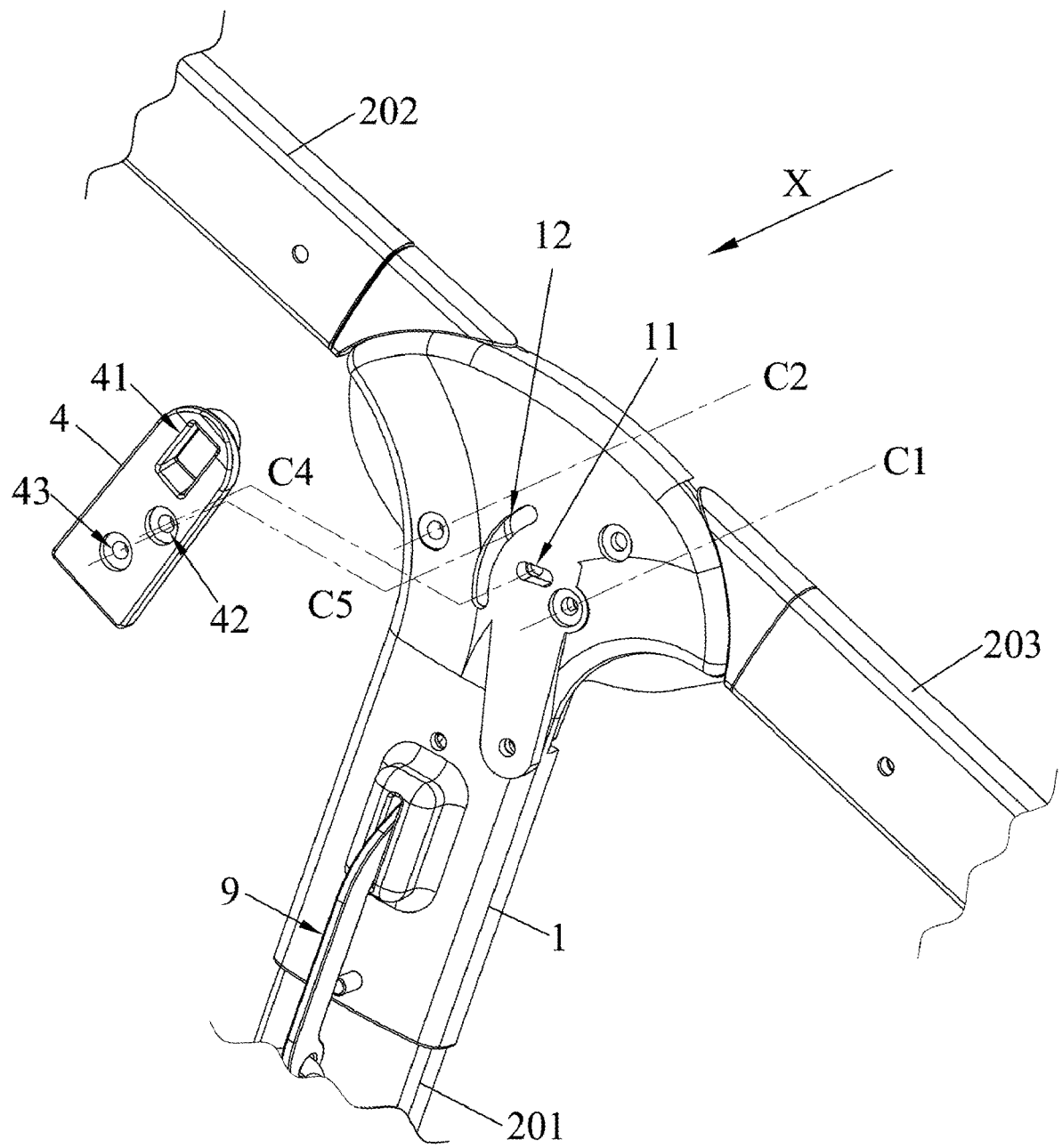
FIG. 6 is a fragmentary and partially exploded perspective view of the embodiment, illustrating that a rear leg, a front leg and a handlebar support of the main frame are connected to the synchronous folding mechanism.

The stroller 200 is convertible between an unfolded position (see FIG. 1) and a folded position (see FIG. 2). The main frame 200a of the stroller 200 includes two front legs 203 that are spaced apart in the left-right direction (X), two rear legs 201 that are spaced apart in the left-right direction (X), and two handlebar supports 202 that are spaced apart in the left-right direction (X).

Figure 7:
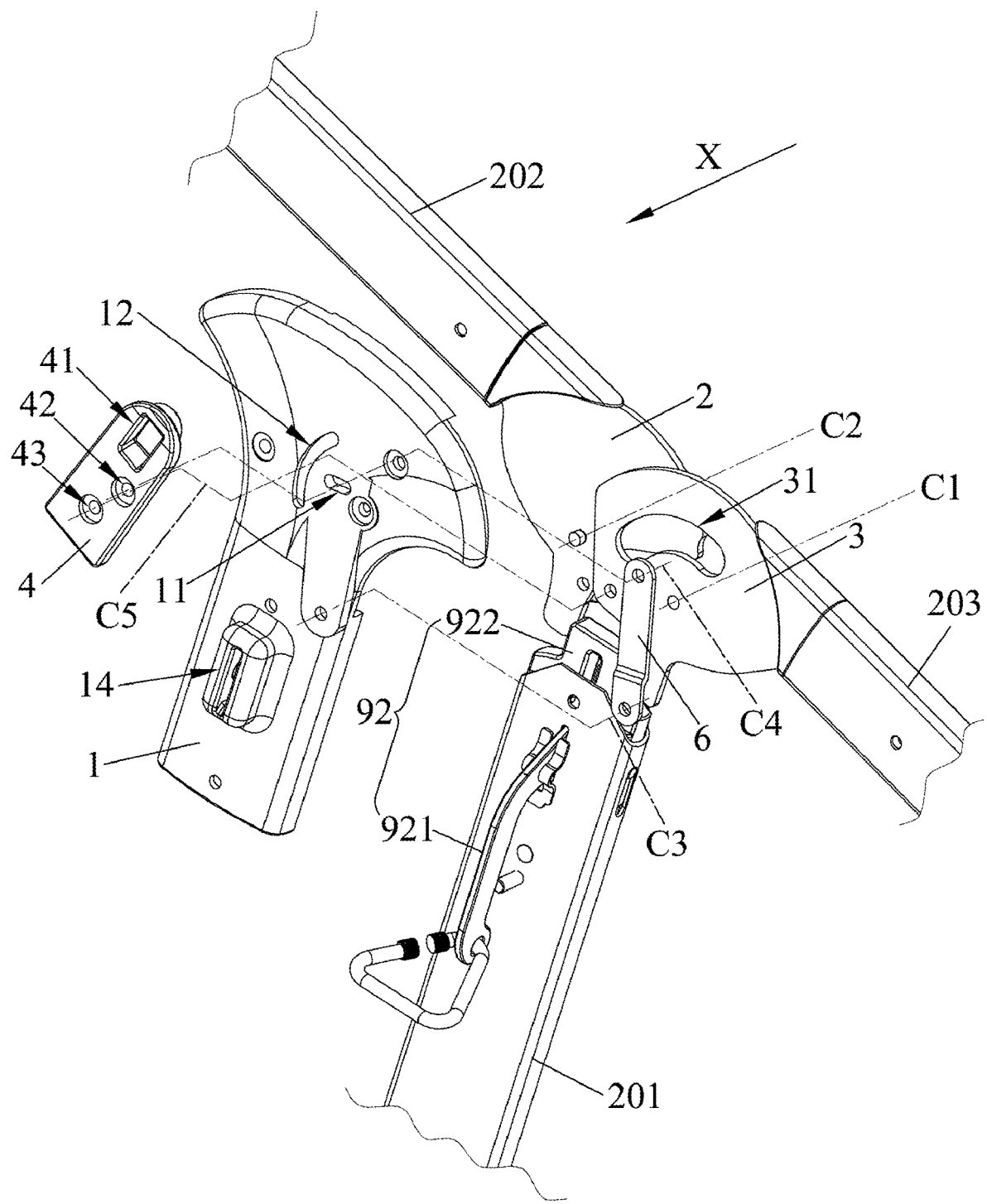
FIG. 7 is another fragmentary and partially exploded perspective view of the embodiment.

Each of the synchronous folding mechanisms 100 is mounted onto the main frame 200a of the stroller 200, and includes a rear joint 1, a handlebar joint 2, a front joint 3, a first link member 4, a swing member 6 (see FIG. 7), a first shaft piece 7, a second shaft piece 8, a second link member 5 (see FIG. 9), and a protective cover 13.

For each of the synchronous folding mechanisms 100, the rear joint 1 is fixedly connected to a respective one of the rear legs 201 of the main frame 200a, the handlebar joint 2 is fixedly connected to a respective one of the handlebar supports 202 of the main frame 200a, the front joint 3 is fixedly connected to a respective one of the front legs 203 of main frame 200a, and the first link member 4 is detachably connected to the snack tray 204.

It should be noted that the abovementioned fixed connections may be secured by screws, but are not limited in such fastening method. In other embodiments, the abovementioned fixed connections may be formed by molding the elements as one piece.

It should also be noted that, in the present embodiment, the first link member 4 of each of the synchronous folding mechanisms 100 is formed with a slot 41, and the snack tray 204 is detachably engaged with the slot 41 of the first link member 4. However, in other embodiments of the disclosure, the first link member 4 may be formed with a protruding member that is detachably engaged with a slot formed in the snack tray 204, or the first link member 4 and the snack tray 204 may be molded as one piece. Therefore, the design for such connections may vary.

For the sake of brevity, the following description refers only to one of the synchronous folding mechanisms 100 and the respective one of the rear legs 201, the respective one of the handlebar supports 202 and the respective one of the front legs 203 that are connected to the one of the synchronous folding mechanisms 100.

Referring to FIGS. 4, 7 and 9 to 11, the front joint 3 is rotatably connected to the rear joint 1 at a first axis (C1) that extends in the left-right direction (X). The handlebar joint 2 is rotatably connected to the rear joint 1 at a second axis (C2) that extends in the left-right direction (X). The swing member 6 has opposite end portions; one of the end portions is rotatably connected to the rear joint 1 at a third axis (C3) that extends in the left-right direction (X), and the first link member 4 is rotatably connected to the other one of the end portions of the swing member 6 at a fourth axis (C4) that extends in the left-right direction (X).

The first link member 4 is further rotatably connected to one of the handlebar joint 2 and the front joint 3 at a fifth axis (C5) that extends in the left-right direction (X) and that is spaced apart from the fourth axis (C4). As a result, rotation of the one of the handlebar joint 2 and the front joint 3 drives a swinging movement of the swing member 6 relative to the rear joint 1 and a movement of the first link member 4 relative to the rear joint 1. In other words, movement of one of the handlebar support 202 and the front leg 203 that is connected to the one of the handlebar joint 2 and the front joint 3 relative to the rear leg 201 is able to drive a collective movement of the snack tray 204 and the first link member 4 relative to the rear leg 201.

Specifically, in the present embodiment, the first link member 4 is connected to the front joint 3, so that rotation of the front joint 3 relative to the rear joint 1 will drive the swinging movement of the swing member 6 and the movement of the first link member 4 relative to the rear joint 1. However, in other embodiments of the disclosure, where the first link member 4 is connected to the handlebar joint 2, the swinging movement of the swing member 6 and the movement of the first link member 4 will be driven by the rotation of the handlebar joint 2 instead.

More specifically on the abovementioned configuration, the rear joint 1 is formed with a first shaft hole 11 and a second shaft hole 12, and the first link member 4 is formed with a first hole 42 and a second hole 43.

The first shaft piece 7 of the synchronous folding mechanism 100 extends along the fourth axis (C4) through the first hole 42 of the first link member 4 and the first shaft hole 11 of the rear joint 1, so as to interconnect the first link member 4 and the other one of the end portions of the swing member 6. In the present embodiment, the first shaft hole 11 is elongated such that the first shaft piece 7 is movable in the first shaft hole 11, but is not limited in such manner.

The second shaft piece 8 of the synchronous folding mechanism 100 extends along the fifth axis (C5) through the second hole 43 of the first link member 4 and the second shaft hole 12 of the rear joint 1, so as to interconnect the first link member 4 and the front joint 3 (or the handlebar joint 2 in other embodiments). In the present embodiment, the second shaft hole 12 is elongated along an arc of another imaginary circle that is centered at the fourth axis (C4) such that the second shaft piece 8 is movable in the second shaft hole 12, but is not limited in such manner.

Figure 9:
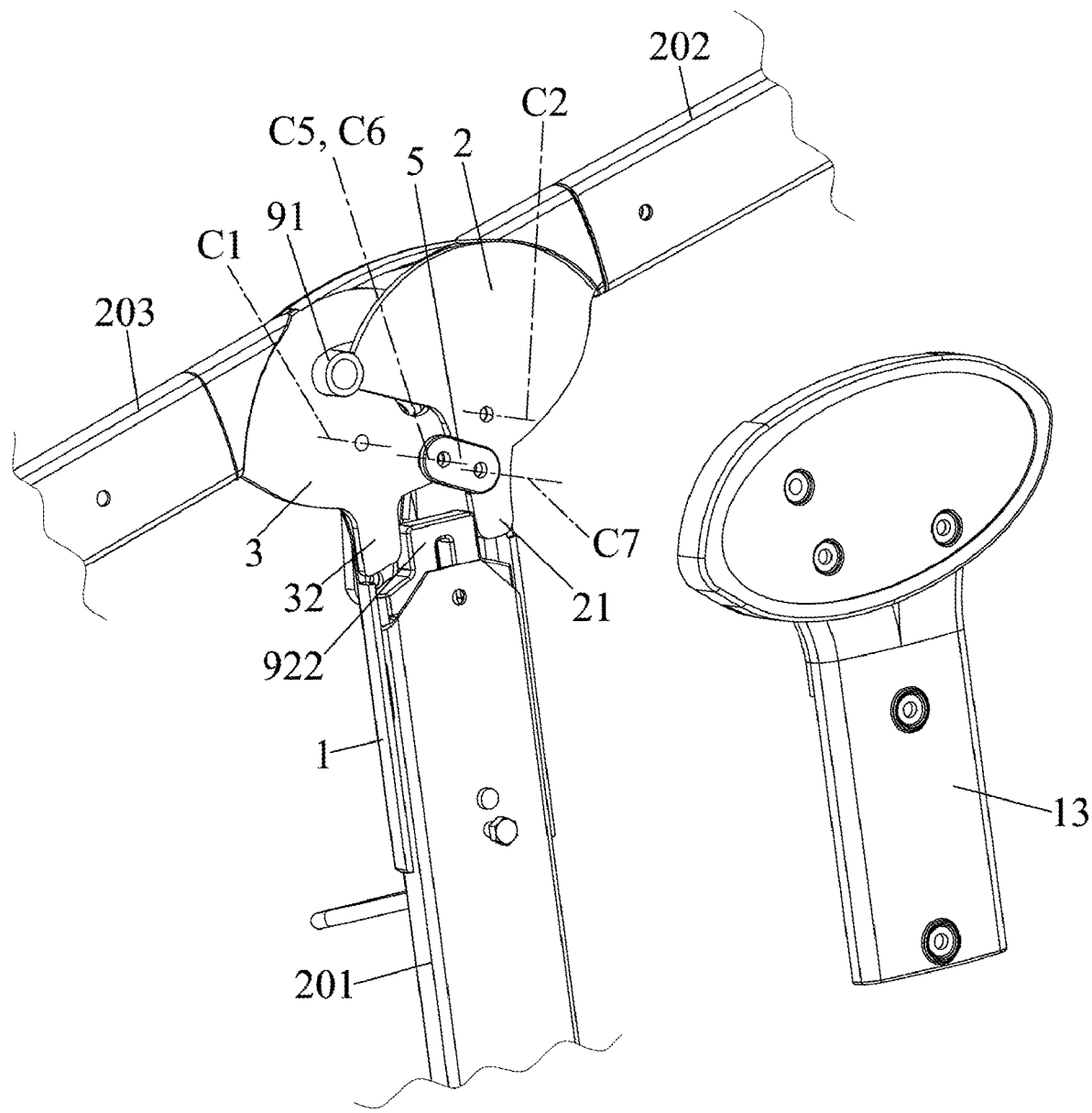
FIG. 9 is a fragmentary and partially exploded perspective view of FIG. 8.
Figure 10:
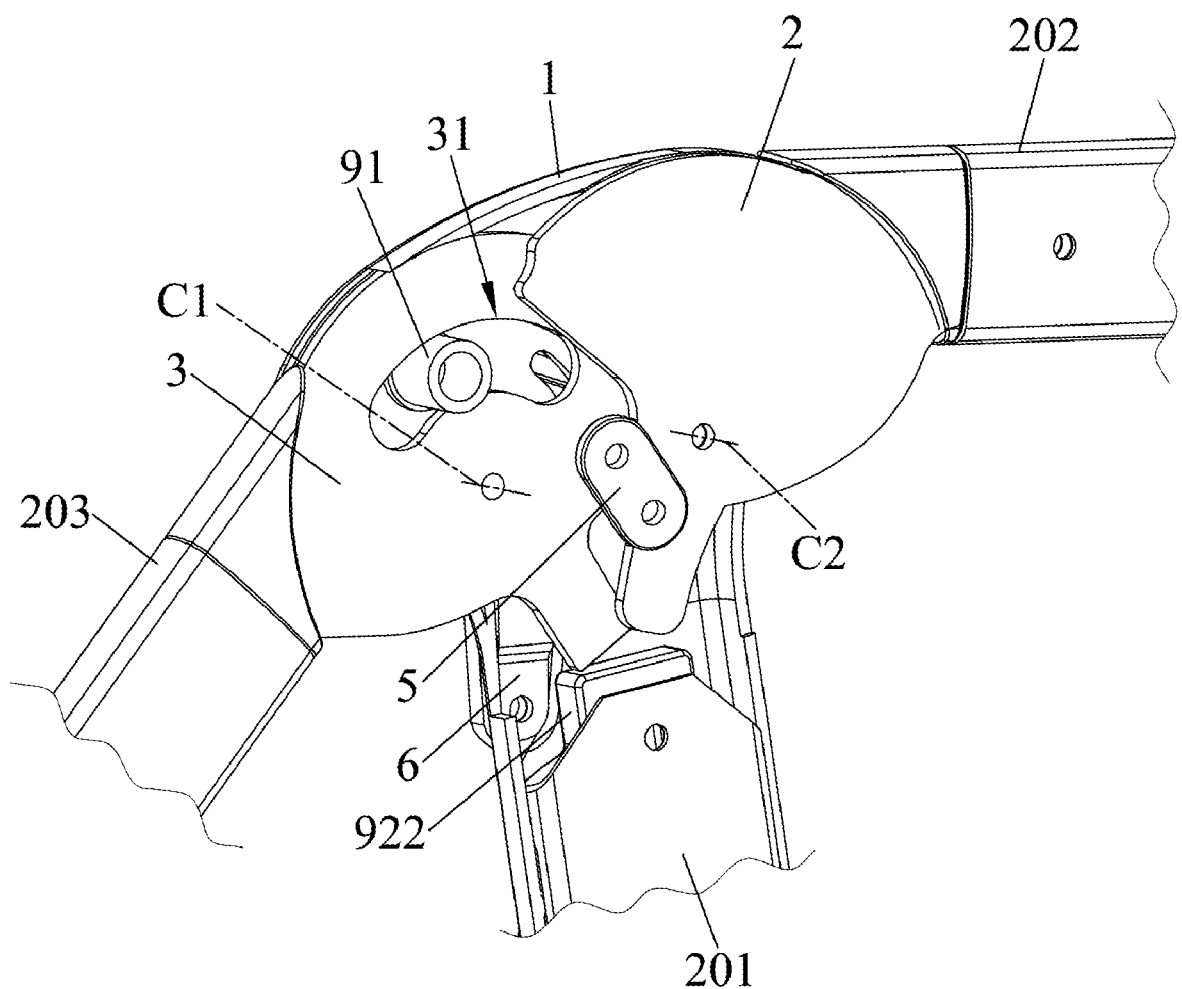
FIGS. 10 and 11 are fragmentary and partially exploded perspective views illustrating the folding process of the embodiment from the unfolded position to the folded position.
Figure 11:
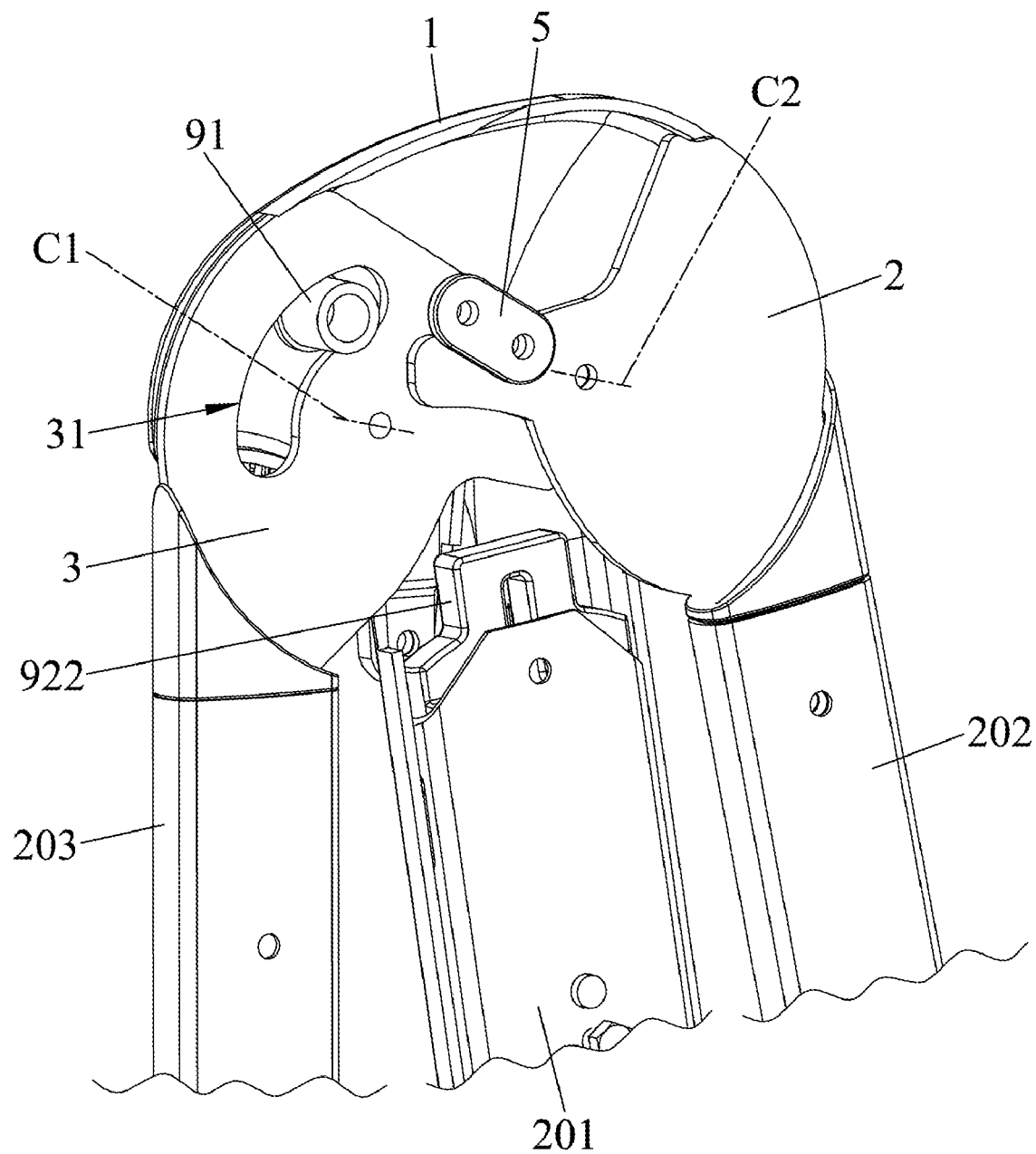

Referring specifically to FIGS. 9 to 11, the second link member 5 of the synchronous folding mechanism 100 has opposite end portions; one of the end portions is rotatably connected to the front joint 3 at a sixth axis (C6) that extends in the left-right direction (X), and the other one of the end portions is rotatably connected to the handlebar joint 2 at a seventh axis (C7) that extends in the left-right direction (X).

It should be noted that, in the present embodiment, the first axis (C1) and second axis (C2) are disposed above the third axis (C3), and are disposed at opposite sides of an imaginary plane that extends vertically and that contains the third axis (C3). In addition, the fifth axis (C5) coincides with the sixth axis (C6). However, in other embodiments, arrangement of the first, second and third axes (C1, C2, C3) may vary, and the fifth axis (C5) may coincide with the seventh axis (C7) instead of the sixth axis (C6).

It should also be noted that, in the present embodiment, the rear joint 1, the handlebar joint 2, the front joint 3 and the second link member 5 cooperatively form a substantially-planar quadrilateral linkage, where the first axis (C1), the second axis (C2), the fifth/sixth axis (C5/C6) and the seventh axis (C7) serve as its four revolute axes. By virtue of such configuration, rotations of the handlebar joint 2 and the front joint 3 relative to the rear joint 1 are synchronized via the second link member 5. That is, when a user rotates one of the handlebar support 202 and the front leg 203 towards the rear leg 201, the other one thereof will rotate towards the rear leg 201 simultaneously.

Moreover, the first link member 4 and the swing member 6 are disposed at opposite sides of the rear joint 1 in the left-right direction (X), and the handlebar joint 2 and the front joint 3 are disposed at the same side of the rear joint 1 as the swing member 6. Such unique arrangement results in a relatively small width of the synchronous folding mechanism 100 in the left-right direction (X).

Figure 8:
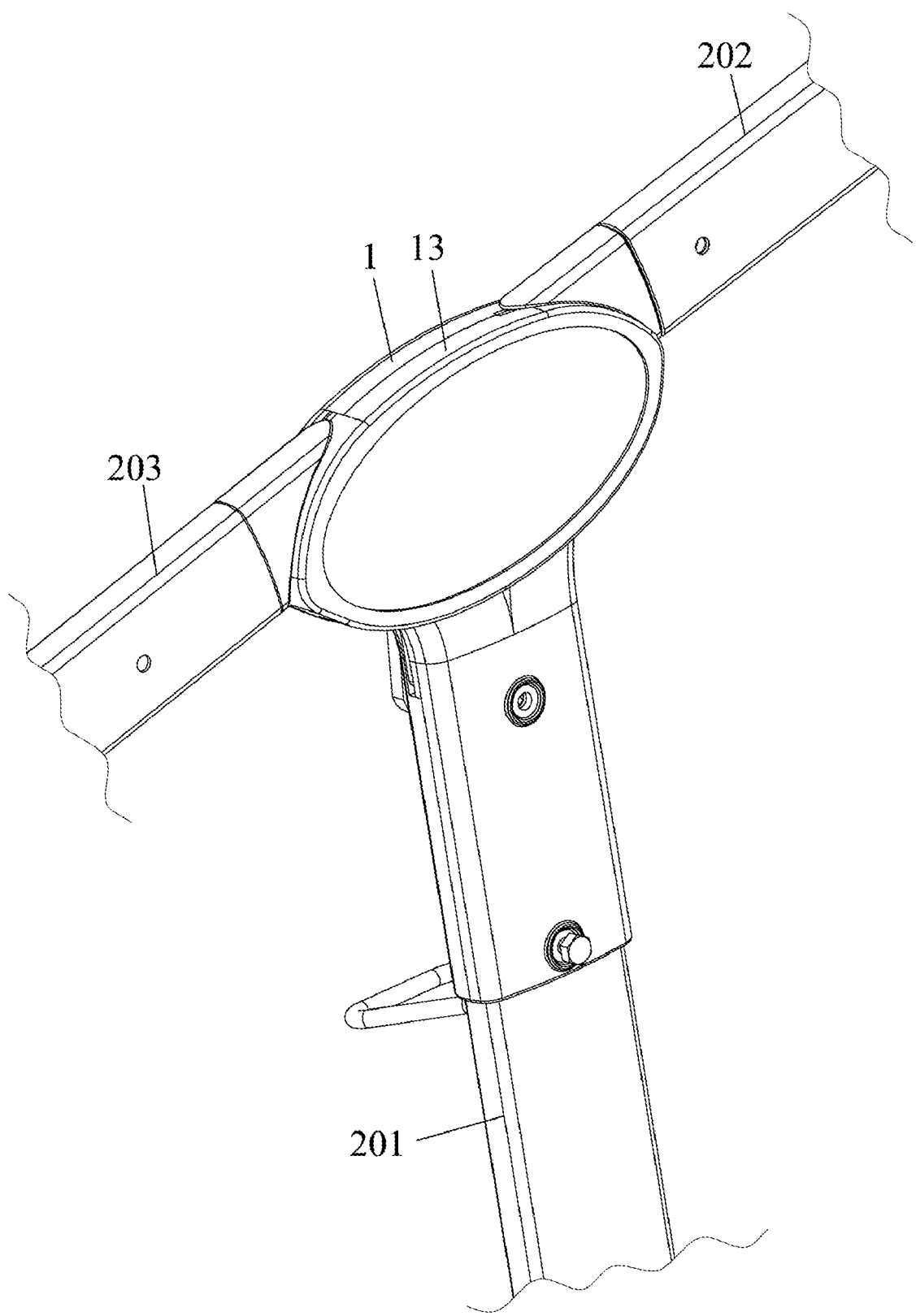
FIG. 8 is a fragmentary perspective view illustrating a protective cover of the main frame.

Referring to FIGS. 8 and 9, the protective cover 13 of the synchronous folding mechanism 100 is connected to the rear joint 1 for covering the handlebar joint 2, the front joint 3, the second link member 5 and the swing member 6. However, depending on actual usage, the protective cover 13 may be omitted in other embodiments of the disclosure.

Referring to FIGS. 6, 7 and 9 to 11, in the present embodiment, the stroller 200 further includes a locking unit 9 that is mounted to the rear joint 1, and that is operable to prevent rotations of the handlebar joint 2 and the front joint 3 relative to the rear joint 1 when the stroller 200 is at the unfolded position.

Specifically, the locking unit 9 includes an abutment member 91 that is fixedly connected to one of the front and rear joints 3, 1, and a blocking member 92 that is movably connected to the rear joint 1. The other one of the front and rear joints 3, 1 is formed with an elongated slot 31 provided for the abutment member 91 to movably extend therethrough.

In the present embodiment, the elongated slot 31 is formed in the front joint 3 and is elongated along an arc of yet another imaginary circle centered at the first axis (C1). The abutment member 91 is fixedly connected to the rear joint 1, extends through the elongated slot 31 of the front joint 3, and is movable along the elongate slot 31 between two distal ends of the elongated slot 31. The blocking member 92 includes a blocking portion 922 that is received in the rear joint 1, and an operative portion 921 that is connected to the blocking portion 922, that extends out of the rear joint 1, and that is operable for driving the blocking portion 922 to slide relative to the rear joint 1 between a locked position (see FIG. 9) and an unlocked position (see FIG. 10). Specifically, the rear joint 1 is further formed with a through slot 14, and the operative portion 921 of the blocking member 92 extends through the through slot 14 out of the rear joint 1 to allow accessibility for user operations.

When the stroller 200 is at the unfolded position and the blocking portion 922 is at the locked position, the abutment member 91 is disposed at a front one of the distal ends of the elongated slot 31. One end of the abutment member 91 abuts forwards against the front joint 3, and an opposite end of the abutment member 91 abuts rearwards against the handlebar joint 2. The blocking member 92 is disposed between and abuts against the front joint 3 and the handlebar joint 2.

More specifically, the front joint 3 has a first protrusion 32 and the handlebar joint 2 has a second protrusion 21. When the stroller 200 is at the unfolded position and the blocking portion 922 is at the locked position, the second protrusion 21 of the handlebar joint 2 is disposed behind the first protrusion 32 of the front joint 3, and the blocking member 92 is clamped between the second protrusion 21 and the first protrusion 32 (i.e., the block member 92 abuts against both the first and second protrusions 32, 21). In such a manner, the abutment member 91 and the blocking member 92 cooperatively prevent the rotations of the front joint 3 and the handlebar joint 2 relative to the rear joint 1.

In regard to usage of the stroller 200, to convert it from the unfolded position to the folded position, the user should first pull on the operative portion 921 of the blocking member 92 to move the blocking portion 922 from the locked position to the unlocked position.

Then, the user may rotate either one of the handlebar support 202 and the front leg 203 toward the rear leg 201. With the design of the first and second link members 4, 5 and the swing member 6, movement of the either one of the handlebar support 202 and the front leg 203 relative to the rear leg 201 will drive the other one of the handlebar support 202 and the front leg 203 to move simultaneously. In the meantime, the snack tray 204 will also be rotated toward the rear leg 201 until the stroller 200 reaches its folded position.

In summary, compared with the prior art, the synchronous folding mechanisms 100 of the present embodiment of the stroller 200 provide the user with a faster and hassle-free folding process, in which the handlebar supports 202, the front legs 203 and the snack tray 204 all move simultaneously relative to the rear legs 201, so that the user can easily fold the stroller 200 into a compact size without having to dismantle the snack tray 204 with tools.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous folding mechanism adapted to be mounted to a stroller, said synchronous folding mechanism comprising:
   a rear joint adapted to be connected to a rear leg of the stroller;
   a front joint adapted to be connected to a front leg of the stroller, and rotatably connected to said rear joint;
   a handlebar joint adapted to be connected to a handlebar support of the stroller, and rotatably connected to said rear joint;
   a swing member having opposite end portions, one of said end portions of said swing member being rotatably connected to said rear joint, the other one of said end portions of said swing member being movably connected to said front joint; and
   a first link member rotatably connected to the other one of said end portions of said swing member, and rotatably connected to one of said handlebar joint and said front joint,
   wherein
   rotation of said front joint drives a swinging movement of said swing member relative to said rear joint, and
   rotation of said one of said handlebar joint and said front joint drives a movement of said first link member relative to the one of said handlebar joint and said front joint.

2. The synchronous folding mechanism as claimed in claim 1, wherein the front joint is rotatably connected to said rear joint at a first axis that extends in a left-right direction with respect to the stroller, the handlebar joint is rotatably connected to said rear joint at a second axis that extends in the left-right direction, the one of said end portions of the swing member is rotatably connected to said rear joint at a third axis that extends in the left-right direction, the first link member is rotatably connected to the other one of said end portions of said swing member at a fourth axis that extends in the left-right direction, and rotatably connected to said front joint at a fifth axis that extends in the left-right direction and that is spaced apart from the fourth axis, and the rotation of said front joint drives the movement of said first link member relative to said front joint.

3. The synchronous folding mechanism as claimed in claim 2, further comprising a second link member, said second link member having opposite end portions, one of said end portions of said second link member being rotatably connected to said front joint at a sixth axis that extends in the left-right direction, the other one of said end portions of said second link member being rotatably connected to said handlebar joint at a seventh axis that extends in the left-right direction, such that rotations of said handlebar joint and said front joint relative to said rear joint are synchronized via said second link member.

4. The synchronous folding mechanism as claimed in claim 3, wherein one of the sixth and seventh axes coincides with the fifth axis.

5. The synchronous folding mechanism as claimed in claim 2, wherein said first link member and said swing member are disposed at opposite sides of said rear joint in the left-right direction, said rear joint is formed with a first shaft hole, and said synchronous folding mechanism further comprises a first shaft piece that extends along the fourth axis through said first shaft hole to interconnect said first link member and the other one of said end portions of said swing member, said first shaft piece being movable in said first shaft hole.

6. The synchronous folding mechanism as claimed in claim 5, wherein said handlebar joint and said front joint are disposed at the same side of said rear joint as said swing member, said rear joint is further formed with a second shaft hole, and said synchronous folding mechanism further comprises a second shaft piece that extends along the fifth axis through said second shaft hole to interconnect said first link member and said front joint, said second shaft piece being movable in said second shaft hole.

7. The synchronous folding mechanism as claimed in claim 6, wherein said second shaft hole is elongated along an arc of an imaginary circle that is centered at the fourth axis.

8. The synchronous folding mechanism as claimed in claim 2, wherein the first and second axes are disposed above the third axis.

9. The synchronous folding mechanism as claimed in claim 8, wherein the first axis and the second axis are disposed at opposite sides of an imaginary plane that extends vertically and that contains the third axis.

10. The synchronous folding mechanism as claimed in claim 1, further comprising a protective cover that is connected to said rear joint for covering said handlebar joint, said front joint and said swing member.

11. A stroller comprising:
an accessory;
a main frame comprising a front leg, a rear leg and a handlebar support; and
said synchronous folding mechanism as claimed in claim 1;
wherein movement of said front leg that is connected to said front joint relative to said rear leg drives movement of said accessory relative to said rear leg.

12. The stroller as claimed in claim 11, wherein said rear joint of said synchronous folding mechanism and said rear leg are fixedly connected, said handlebar joint of said synchronous folding mechanism and said handlebar support are fixedly connected, and said front joint of said synchronous folding mechanism and said front leg are fixedly connected.

13. The stroller as claimed in claim 11, further comprising a locking unit that is mounted to said rear joint of said synchronous folding mechanism, and that is operable to prevent rotations of said handlebar joint and said front joint relative to said rear joint when said stroller is at an unfolded position.

14. The stroller as claimed in claim 13, wherein one of said front and rear joints is formed with an elongated slot, said locking unit comprises:
an abutment member that is fixedly connected to the other one of said front and rear joints, that extends through said elongated slot, and that is movable along said elongate slot between two distal ends of said elongated slot; and
a blocking member that is movably connected to said rear joint;
when said stroller is at the unfolded position, said abutment member is disposed at one of said distal ends of said elongated slot, and has one end that abuts against said one of said front and rear joints, and an opposite end that abuts against said handlebar joint; and
when said stroller is at the unfolded position, said blocking member is disposed between and abuts against said front joint and said handlebar joint, said abutment member and said blocking member cooperatively prevent rotations of said front joint and said handlebar joint relative to said rear joint.

15. The stroller as claimed in claim 14, wherein the front joint is rotatably connected to said rear joint at a first axis that extends in a left-right direction with respect to the stroller, and said elongated slot is elongated along an arc of an imaginary circle that is centered at the first axis.

16. The stroller as claimed in claim 14, wherein said front joint of said synchronous folding mechanism comprises a first protrusion that abuts said blocking member when said stroller is at the unfolded position, said handlebar joint of said synchronous folding mechanism comprises a second protrusion that abuts said blocking member when said stroller is at the unfolded position, and when said stroller is at the unfolded position, said blocking member is clamped between said second protrusion and said first protrusion, and said second protrusion is disposed behind said first protrusion.

17. The stroller as claimed in claim 14, wherein, when said stroller is at the unfolded position, said abutment member is disposed at a front one of said distal ends of said elongated slot, said one end of said abutment member abuts forwards against said one of said front and rear joints, and said opposite end of said abutment member abuts rearwards against said handlebar joint.

18. The stroller as claimed in claim 14, wherein said blocking member comprises:
a blocking portion that is received in said rear joint; and
an operative portion that is connected to said blocking portion, that extends out of said rear joint, and that is operable for driving said blocking portion to slide relative to said rear joint.

19. The stroller as claimed in claim 18, wherein said rear joint is formed with a through slot, and said operative portion of said blocking member extends through said through slot out of said rear joint.

20. The stroller as claimed in claim 11, wherein the front joint is rotatably connected to said rear joint at a first axis that extends in a left-right direction with respect to the stroller, the handlebar joint is rotatably connected to said rear joint at a second axis that extends in the left-right direction, the one of said end portions of the swing member is rotatably connected to said rear joint at a third axis that extends in the left-right direction, said first link member is rotatably connected to the other one of said end portions of said swing member at a fourth axis that extends in the left-right direction, and rotatably connected to said front joint at a fifth axis that extends in the left-right direction and that is spaced apart from the fourth axis, the rotation of said front joint drives the movement of said first link member relative to said front joint, and said accessory is detachably connected to said first link member of said synchronous folding mechanism.

* * * * *